United States Patent [19]
Chen et al.

[11] Patent Number: 6,005,995
[45] Date of Patent: Dec. 21, 1999

[54] FREQUENCY SORTER, AND FREQUENCY LOCKER FOR MONITORING FREQUENCY SHIFT OF RADIATION SOURCE

[75] Inventors: George C. K. Chen, Santa Clara; Ho-Shang Lee, El Sobrante; Wen-Herng Su, San Jose; Feng Ye, El Sobrante; David Polinsky, San Francisco, all of Calif.

[73] Assignee: Dicon Fiberoptics, Inc., Berkeley, Calif.

[21] Appl. No.: 08/905,087

[22] Filed: Aug. 1, 1997

[51] Int. Cl.$^6$ .............................. G02B 6/28; H04J 14/00
[52] U.S. Cl. ................. 385/24; 385/15; 385/16; 385/31; 385/33; 385/34; 385/39; 359/115; 359/124; 359/127; 359/131
[58] Field of Search ................... 385/15, 16, 24, 385/31, 33, 34, 18, 39, 42, 49; 359/115, 124, 127, 154, 161, 173, 131

[56] References Cited

U.S. PATENT DOCUMENTS

| | | | |
|---|---|---|---|
| 4,896,935 | 1/1990 | Lee | 356/73.1 |
| 5,076,672 | 12/1991 | Tsuda et al. | 359/244 |
| 5,428,700 | 6/1995 | Hall | 372/32 |
| 5,446,809 | 8/1995 | Fritz et al. | 385/17 |
| 5,453,827 | 9/1995 | Lee | 385/15 X |
| 5,493,625 | 2/1996 | Glance | 385/24 |
| 5,542,010 | 7/1996 | Glance et al. | 385/14 |
| 5,574,588 | 11/1996 | Kawanishi et al. | 359/158 |
| 5,742,416 | 4/1998 | Mizrahi | 359/134 |

OTHER PUBLICATIONS

"Thermal effects in optical systems," Thomas H. Jamieson, reprinted with permission from *Optical Engineering* (vol. 20(2), pp. 156–160, Mar./Apr. 1981), pp. 271–275.

"The primary technical challenges deal with achieving low losses in a narrow passband region," David Polinsky, Ph.D., *Lightwave*, Feb. 1996, pp. 1–4.

SELFOC®, product guide by NSG America (no date).

ULE™ Zero Expansion Glass product guide by Corning Incorporated (no date).

*Primary Examiner*—Brian Healy
*Attorney, Agent, or Firm*—Majestic, Parsons, Siebert & Hsue P.C.

[57] ABSTRACT

In order to tune the frequencies of radiation sources, a frequency locker is provided having equally spaced periodic frequencies with a spectral range substantially equal to the frequency spacing of a plurality of radiation sources with equally spaced apart frequencies. The periodic frequencies of the locker are slightly offset from those of the radiation sources. Radiation from each of the sources is passed through the locker and the radiation passed by the locker is detected and used to adjust the frequencies of the sources in order to tune the sources. The frequency locker includes an etalon with dimensions accurate to 0.5 microns or better. The dimension of the etalon may be controlled by controlling the thickness of spacers for maintaining vacuum or air gaps where the dimensions may be altered by thin film deposition and etching techniques. The optical path length of the etalon may also be changed by altering the angle of incidence of an incoming beam with the reflective surfaces of the etalon.

42 Claims, 8 Drawing Sheets

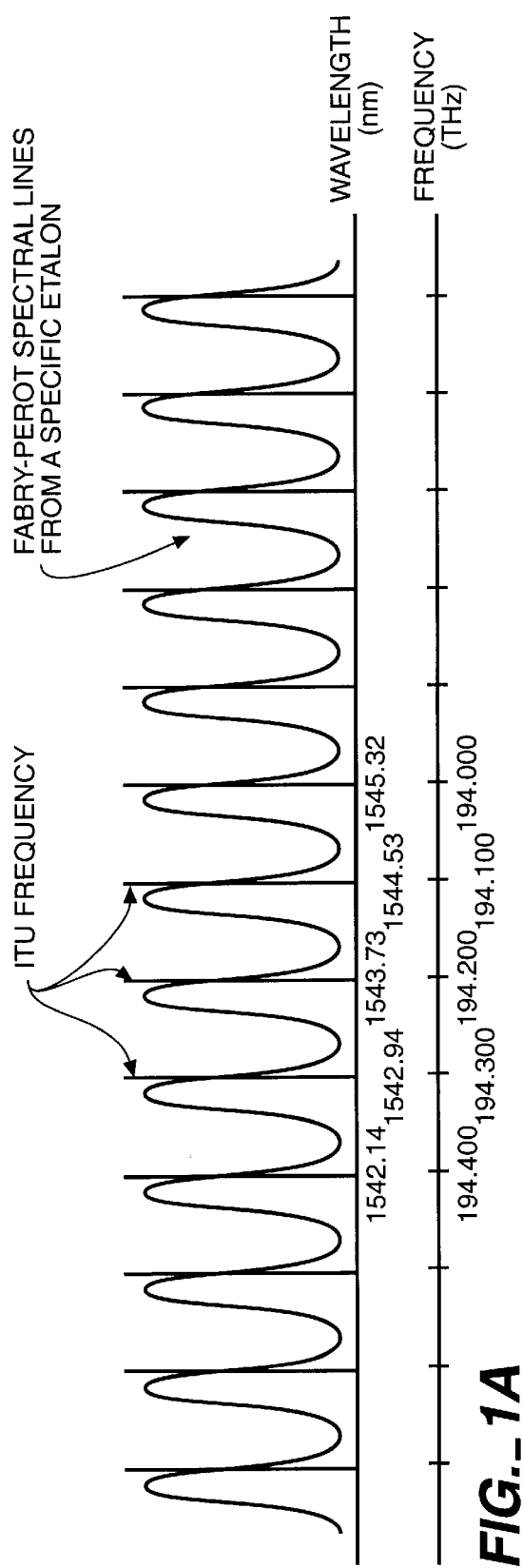
FIG._1A
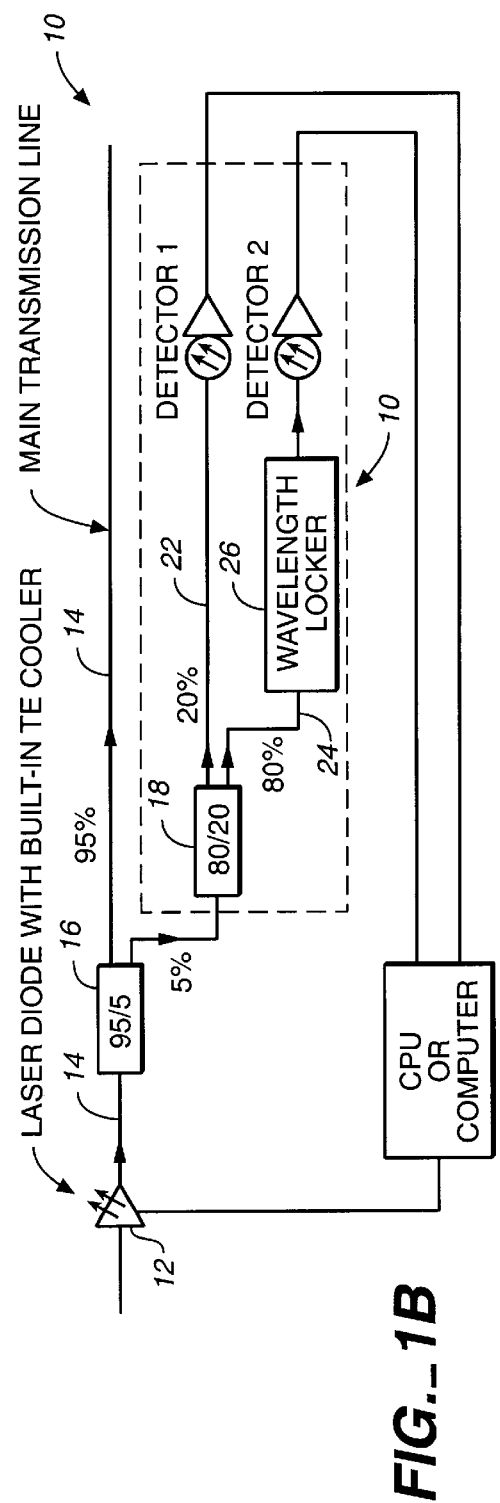
FIG._1B

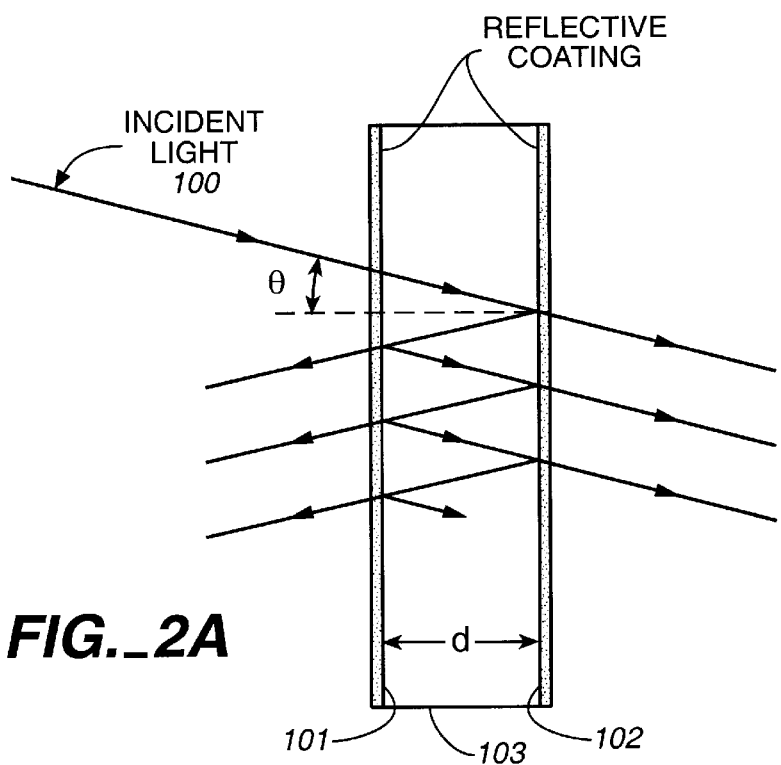
FIG._2A
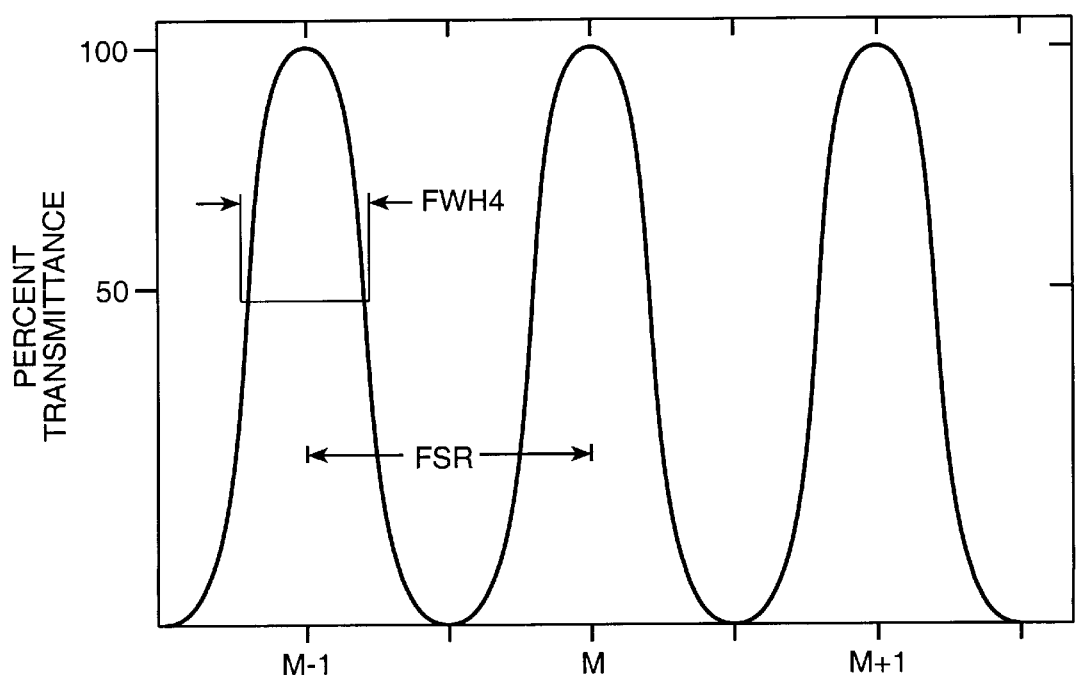
FIG._2B

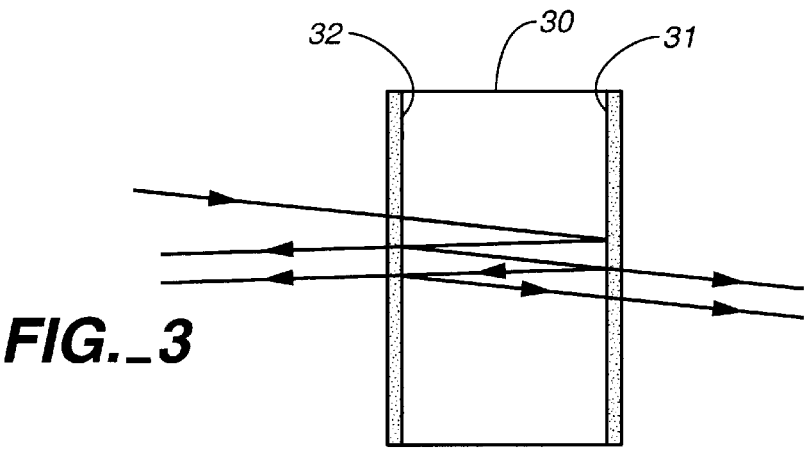
FIG._3
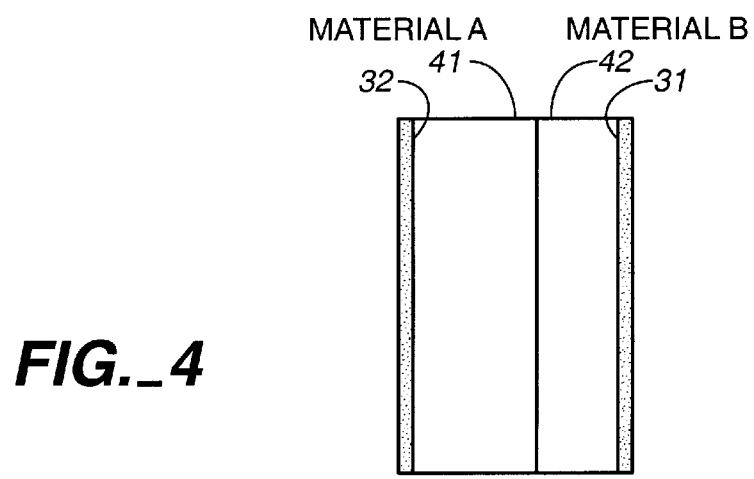
FIG._4
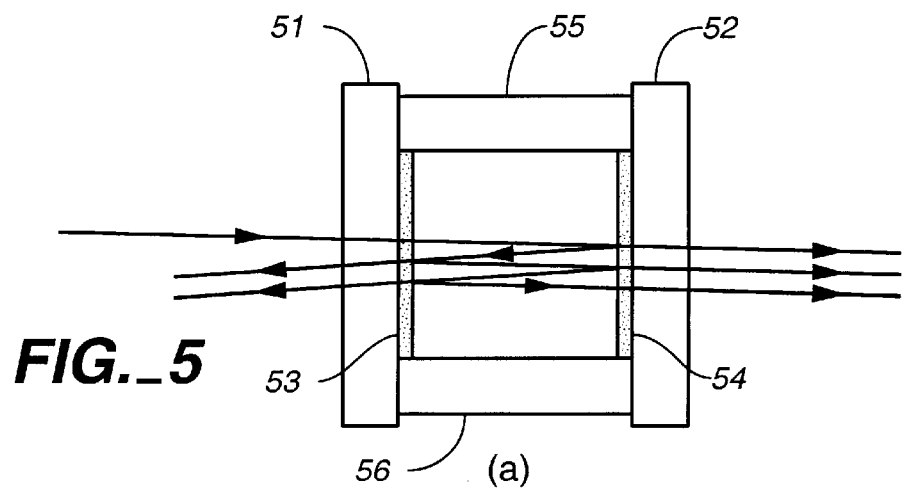
FIG._5

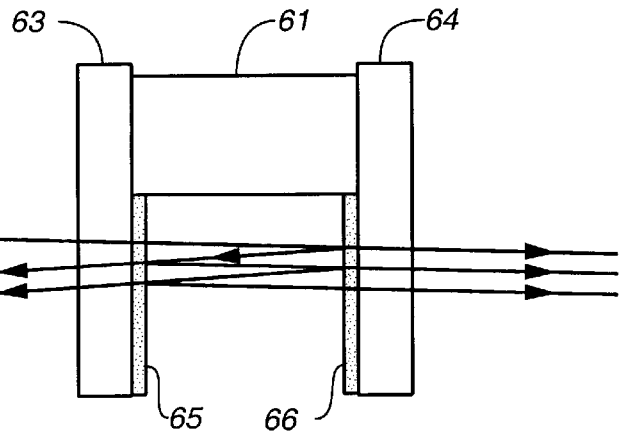
FIG._6
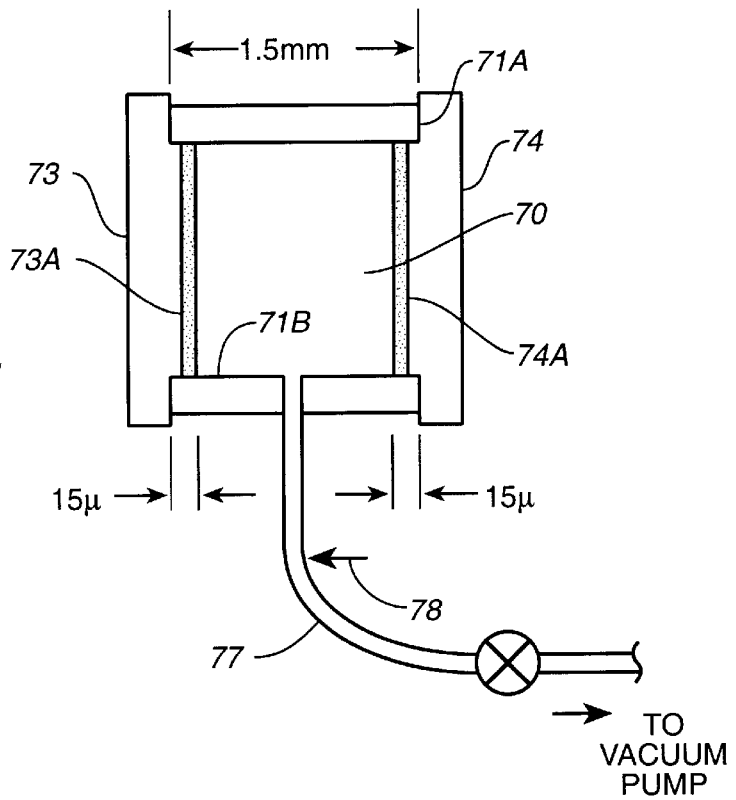
FIG._7
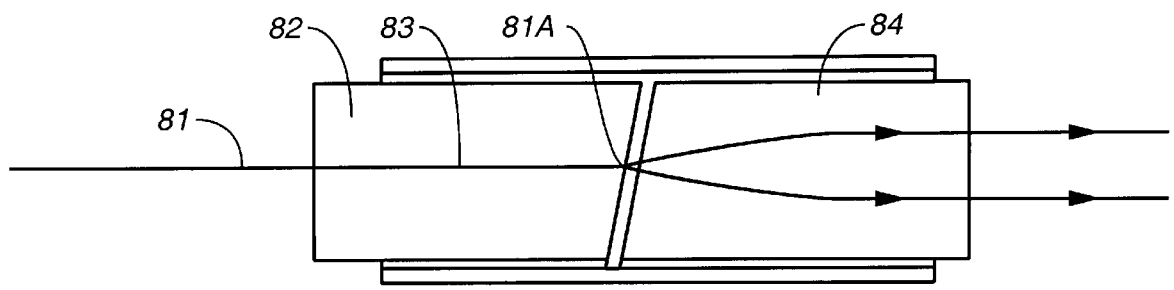
FIG._8

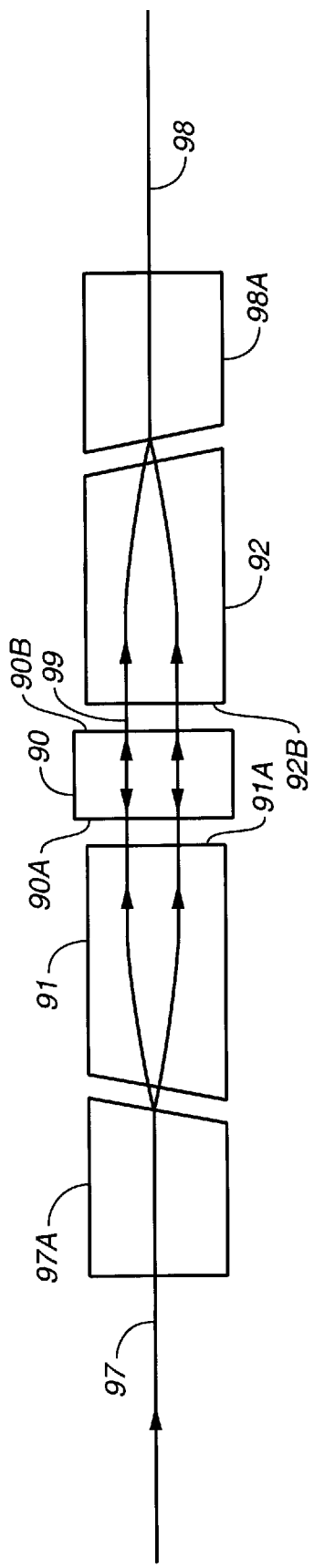

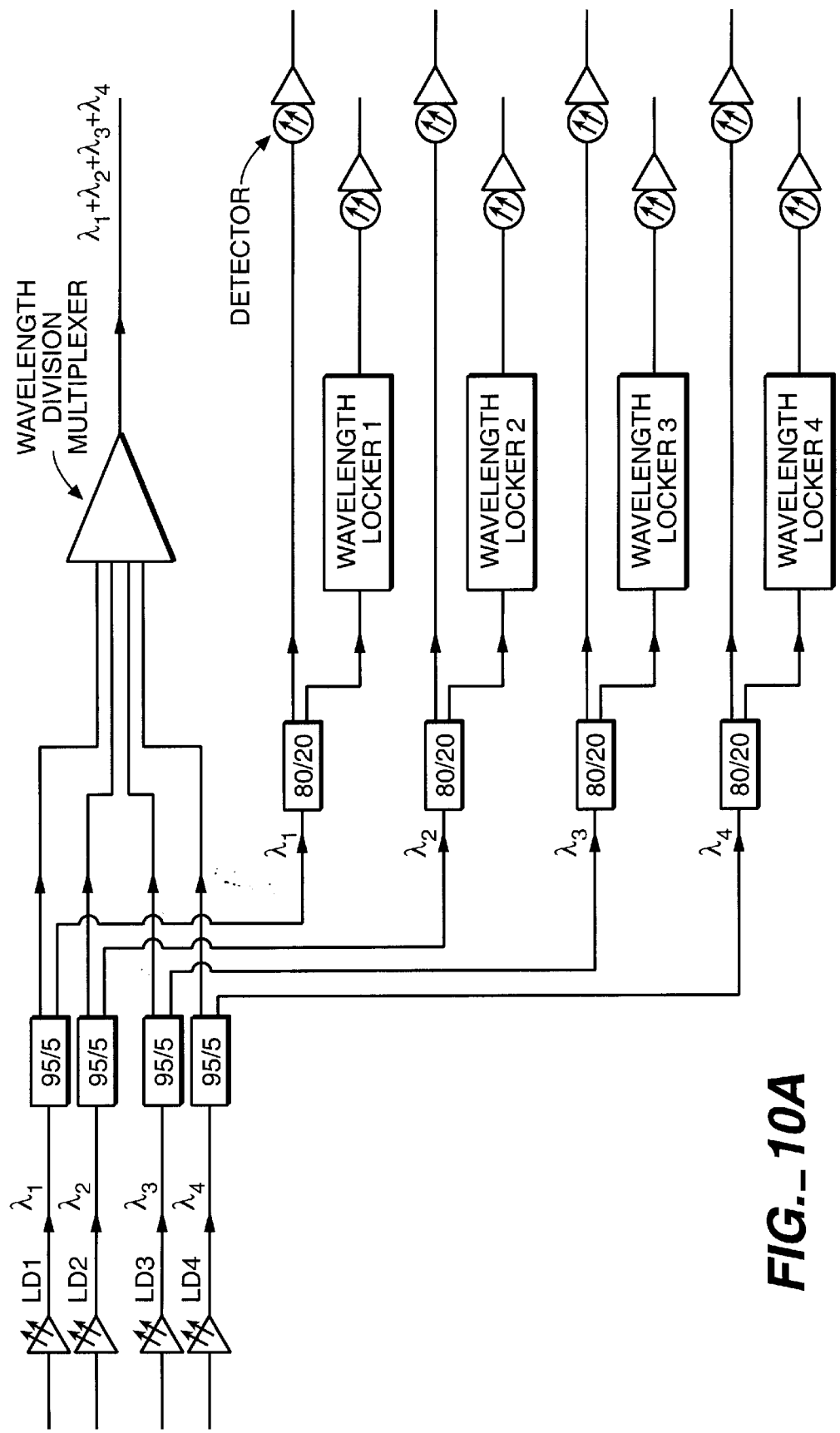
FIG._10A

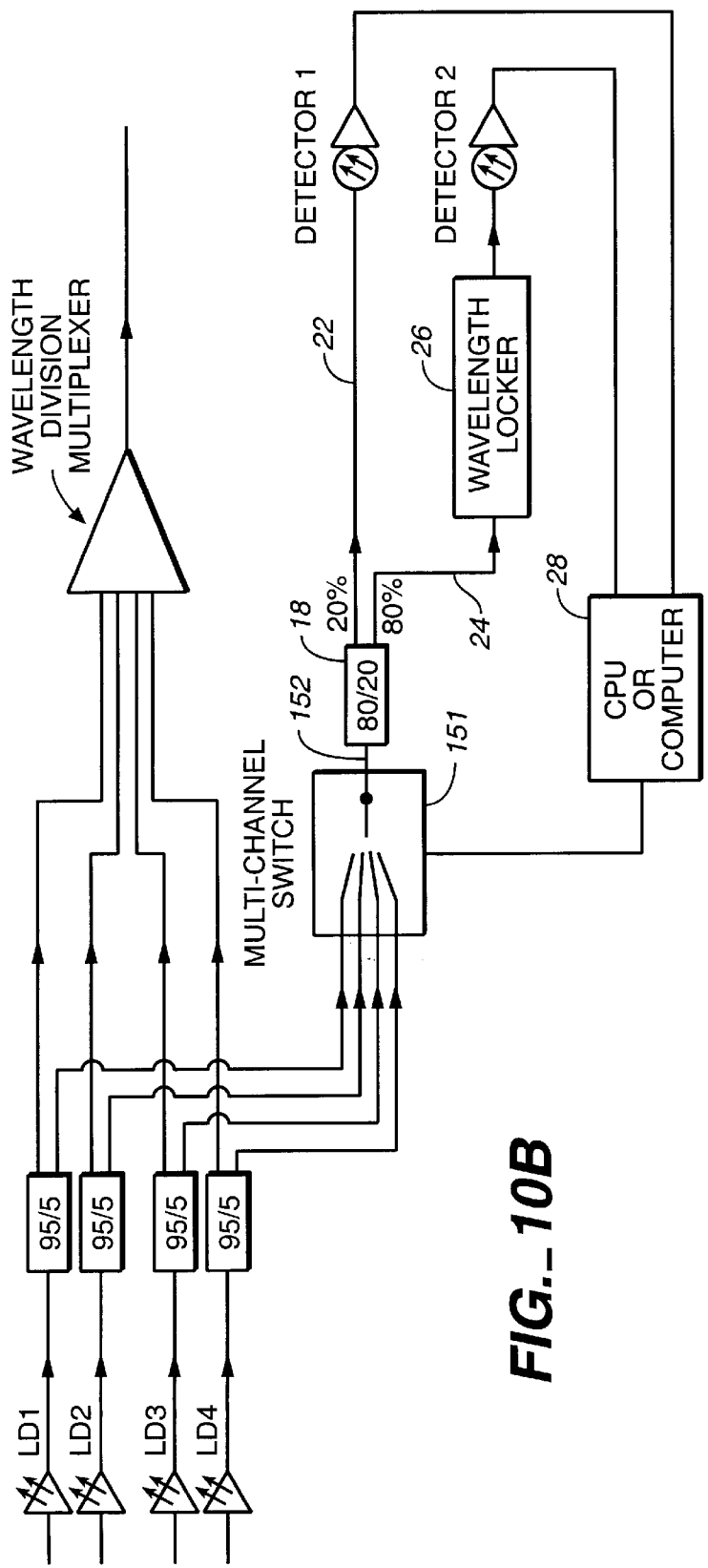
FIG._10B
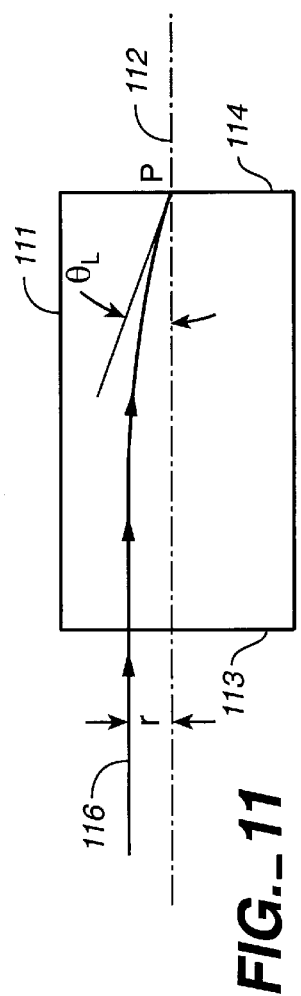
FIG._11

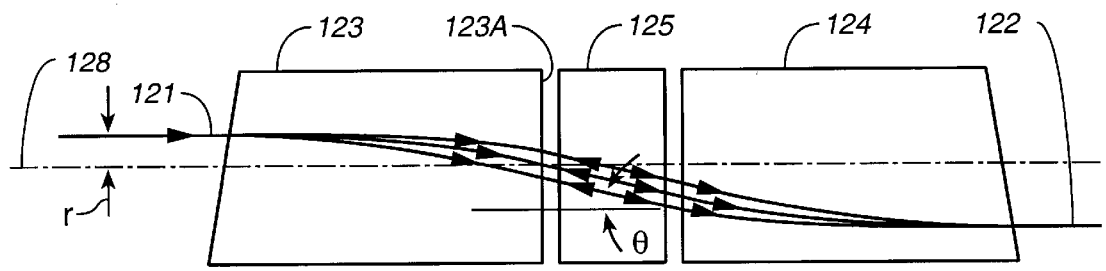
FIG._12
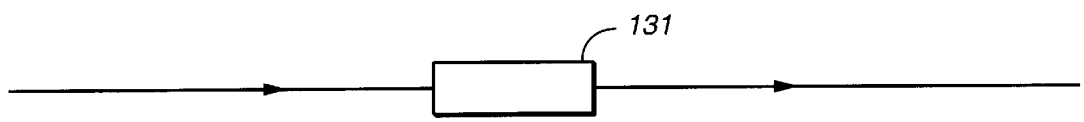
FIG._13A
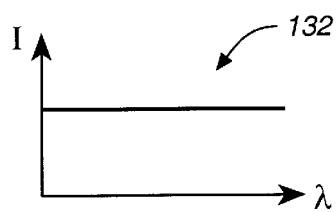
FIG._13B
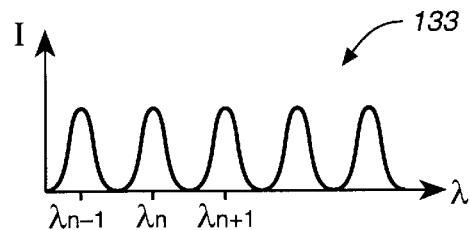
FIG._13C
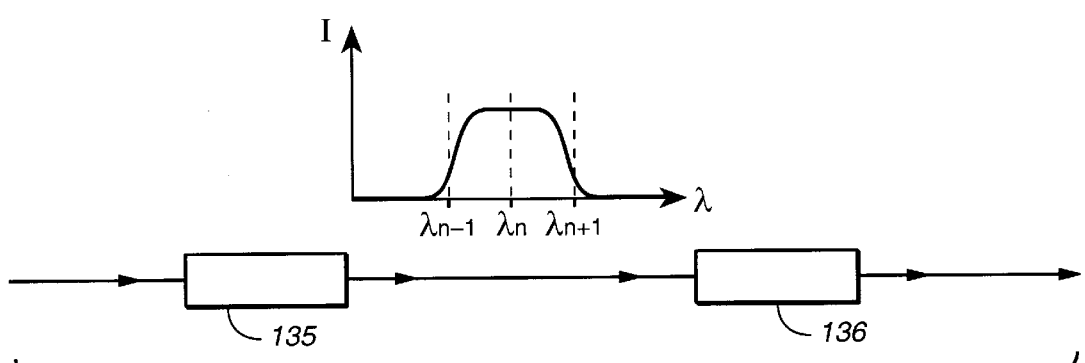
FIG._14A
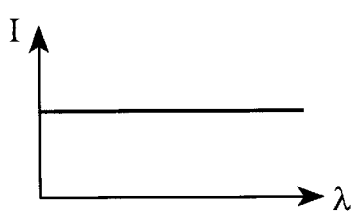
FIG._14B
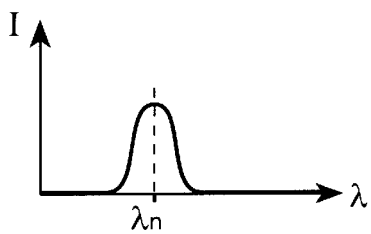
FIG._14C

FREQUENCY SORTER, AND FREQUENCY LOCKER FOR MONITORING FREQUENCY SHIFT OF RADIATION SOURCE

BACKGROUND OF INVENTION

This invention relates in general to monitoring of radiation sources, and in particular to the use of frequency lockers for monitoring frequency shift of radiation sources. The invention is particularly useful for enhancing performance of wavelength division multiplexing in fiber optics communication.

As fiber optics matures and gradually replaces microwave links in telecommunication industry, there is great need for increasing the capacity of these optical links. One way to achieve higher capacity is to increase bit rate of the link. This is called time division multiplexing, where multi-Giga bit of data is transmitted across this media. While time division multiplexing is adequate for moderate speed links, high capacity links have increasingly turned to wavelength division multiplexing (WDM), where multiple wavelength channels are simultaneously used to transmit data across the fiber.

WDM based systems have evolved rapidly from early two channel systems to the current 8 channel system. International Telecommunication Union (ITU) has even proposed a 45 channel system utilizing wavelength range from 1533 to 1565 nm with channel spacing of 100 GHz (about 0.8 nm). This system, referred to herein as the ITU system, is pushing the state-of-art of the various fiber optics components. It challenges optical component manufacturers to provide ultra-narrow bandwidth filters, transmitting lasers with highly stable frequencies, and optical components with high bandwidth capability etc. This invention relates to the enhancement of laser stability attained via the application of Fabry-Perot interference filter in laser frequency monitoring and control.

The currently deployed laser systems are based on Distributed feedback (DFB) lasers operating in 1550 nm range. These lasers can be tuned in frequency by heating or cooling the laser using Thermal electric cooler. However, there is up until now, no frequency reference at reasonable cost for these lasers to lock on to establish less than 0.1 nm wavelength shift over the field operating temperature range from −20 to 85° C. This invention describes the many implementations of this stable reference filter based on Fabry-Perot interferometer principle.

It is, therefore, desirable to provide a frequency reference at reasonable cost for lasers in order to maintain the laser at predetermined frequencies.

SUMMARY OF THE INVENTION

One aspect of the invention is directed towards a method for locking the frequencies of a plurality of radiation sources substantially to predetermined equally spaced frequencies spaced apart by a predetermined frequency spacing, comprising providing one or more frequency lockers each having equally spaced periodic frequencies with a free spectral range (FSR) substantially equal to the predetermined frequency spacing, wherein said periodic frequencies are close to the predetermined frequencies; and passing radiation from each of the sources through the locker or one of the lockers. The method further comprises detecting radiation passed by the locker or one of the lockers; providing first outputs and adjusting the frequency of each of the sources in response to one of said first outputs.

Another aspect of the invention is directed towards an apparatus for locking the frequencies of a plurality of radiation sources substantially to predetermined equally spaced frequencies spaced apart by a predetermined frequency spacing, comprising one or more frequency lockers, the locker or each of the lockers having equally spaced periodic frequencies with a free spectral range (FSR) substantially equal to the predetermined frequency spacing; means for passing radiation from each of the sources through the locker or one of the lockers; one or more first detectors detecting radiation passed by the locker or one of the lockers to provide first outputs; and means for adjusting the frequency of each of the sources in response to one of said first outputs.

Yet another aspect of the invention is directed towards a frequency sorting device, comprising an etalon having an optical path length that is accurate to about 0.5 microns or better; an input optical fiber supplying radiation to the etalon and an output optical fiber delivering radiation from the etalon.

One more aspect of the invention is directed towards a frequency sorting method, comprising providing an etalon having an optical path length that is accurate to about 0.5 microns or better; supplying broadband radiation to the etalon and delivering from the etalon radiation having periodic peak frequencies with a frequency spacing.

Still one more aspect of the invention is directed towards a frequency sorting method, comprising providing an etalon having an optical path length that is accurate to about 0.5 microns or better; supplying radiation within a passband to the etalon and delivering radiation having a narrower bandwidth than the passband from the etalon.

An additional aspect of the invention is directed towards an optical device comprising an etalon having two reflective surfaces and a first GRIN lens abutting one of the surfaces.

Still another aspect of the invention is directed towards a method for making an etalon, comprising determining a desired optical path length for the etalon; providing two reflective surfaces and adjusting the optical path length of the etalon. The adjusting includes changing a distance between the surfaces or altering an angle of incidence of a beam of radiation on said surfaces, so that an optical distance through an optical medium between the surfaces is substantially equal to the desired optical path length, said changing including thin film deposition or etching.

One more aspect of the invention is directed towards a multiplexer system comprising a plurality of radiation sources providing radiation at predetermined equally spaced frequencies spaced apart by a predetermined frequency spacing; a plurality of optical channels, each channel conveying radiation from a corresponding source to a wavelength division multiplexer or from a wavelength division demultiplexer. The system further includes a frequency locker having equally spaced periodic frequencies with a free spectral range (FSR) substantially equal to the predetermined frequency spacing for detecting a frequency shift of radiation from each of the sources and to provide an output; splitters, each splitter diverting a percentage of radiation from a corresponding optical channel; a multi-channel switch sequentially providing radiation diverted by one of the splitters to the frequency locker to sequentially detect a frequency shift in the plurality of sources and means for adjusting frequencies of the plurality of sources in response to the output.

Yet another aspect of the invention is directed towards a method for locking the frequencies of a plurality of radiation sources to International Telecommunication Union (ITU) frequencies, comprising measuring a frequency shift of said sources relative to said ITU frequencies; and adjusting the frequencies of said radiation sources in response to said frequency shift so that such frequencies are substantially equal to said ITU frequencies.

BRIEF DESCRIPTION OF THE DRAWINGS

FIG. 1A is a graphical illustration of Fabry-Perot spectral lines of an etalon in reference to ITU frequencies useful for illustrating the invention.

FIG. 1B is a block diagram of an optical system including a frequency locker for adjusting the frequencies of radiation emitted by a laser to illustrate the preferred embodiment of the invention.

FIG. 2A is a schematic view of an etalon useful for illustrating the invention.

FIG. 2B is a graphical plot of the transmittance of radiation through the etalon of FIG. 2A to illustrate the invention.

FIG. 3 illustrates a basic Fabry-Perot etalon.

FIG. 4 is a cross-sectional view of a composite etalon, where the spacing between two reflective surfaces is filled by two different optical materials to illustrate one embodiment of the invention.

FIG. 5 is a cross-sectional view of an etalon with two spacers, one on each side, between two reflective surfaces to illustrate another embodiment of the invention.

FIG. 6 is a cross-sectional view of an etalon with a spacer between two reflective surfaces where the spacer is on one side of the spacing.

FIG. 7 is a partially cross-sectional and partially schematic view of another etalon where the space between two reflective surfaces is evacuated to illustrate yet another embodiment of the invention.

FIG. 8 is a cross-section view of an optical fiber, a ferrule and a GRIN lens to illustrate a collimating device useful in the invention.

FIG. 9A is a cross-sectional view of an optical system including an etalon and a pair of GRIN lenses, one on each side of the etalon and ferrules to illustrate another aspect of the invention.

FIG. 9B is a spectrum of the radiation input to the system of FIG. 9A.

FIG. 9C is the spectrum of radiation emerging from the system of FIG. 9A.

FIG. 10A is a block diagram of a multiplexer system employing frequency lockers to illustrate yet another aspect of the invention.

FIG. 10B is a block diagram of a multiplexer system where only one frequency locker is used for controlling the frequencies of a number of lasers to illustrate still another aspect of the invention.

FIG. 11 is a cross-sectional view of a GRIN lens illustrating how the angle of incidence can be controlled by selecting the distance of an incoming beam of radiation from the axis of the lens useful for illustrating the invention.

FIG. 12 is a cross-sectional view of an etalon and two GRIN lenses adjacent to or abutting the etalon to illustrate a method for altering the optical path length of the etalon by changing the distance between an input radiation beam from the axes of the lenses to illustrate yet another aspect of the invention.

FIG. 13A is a schematic view of an etalon that can be used as a filter.

FIG. 13B is a spectrum of radiation that is input to the filter of FIG. 13A.

FIG. 13C is a spectrum of radiation emerging from the filter of FIG. 13A.

FIG. 14A is a schematic view of a filter system comprising a filter with a passband followed by an etalon to illustrate still another aspect of the invention.

FIG. 14B is a spectrum of the radiation input to the filter system of FIG. 14A.

FIG. 14C is the spectrum of radiation emerging from the filter system of FIG. 14A.

For simplicity in description, identical components are labelled by the same numerals in this application and figures.

DETAILED DESCRIPTION OF THE PREFERRED EMBODIMENT

The proposed ITU frequencies, separated by 100 GHz, are also known as ITU grid. This uniform frequency spacing is also very suitable to Fabry-Perot (F-P) based frequency filter. The F-P filter has also uniform spaced transmission peaks as shown in FIG. 1A and can be designed to match ITU grid. Thus, a group of lasers, providing radiation at frequencies that are separated by a frequency spacing of 100 GHz, can all be monitored and controlled by one Fabry-Perot reference filter, or called wavelength locker in the present invention so that they emit radiation substantially at the ITU frequencies. The economic benefit of one universal wavelength locker applicable to control a group of lasers is self-evident. This avoids the need to stock more than 30 items of wavelength lockers for each of the wavelength channels. For simplicity, the monitoring of one laser source is first described.

In order to monitor frequency shift of a laser from a corresponding ITU frequency, the radiation from the laser is passed through a Fabry-Perot etalon. The etalon is designed so that peaks of Fabry-Perot etalon spectral lines are slightly displaced from the ITU frequencies as indicated in FIG. 1A. The center frequency of the laser should be equal to a corresponding ITU grid frequency. As the center frequency of the laser is shifted away from the corresponding ITU frequency, the output power through the Fabry-Perot filter is also changed. By detecting the power change, the direction of wavelength or frequency shift can be judged and the correction to shift is turned on by heating or cooling the laser. Thus, in reference to FIG. 1A, if the power output through the filter or etalon decreases, this indicates that the frequency of the laser has decreased and shifted to the right in FIG. 1A. This means that the laser frequency should be increased. Of course, the opposite will hold if the spectral peaks are on the right side of the corresponding ITU frequencies instead of on the left side as shown in FIG. 1A.

FIG. 1B shows a physical configuration of wavelength monitoring scheme 10 using a wavelength locker. Light from a laser diode 12 is passed through an optical fiber 14 which serves as the main transmission line. A small percentage, saying 5%, of light is tapped out of the main transmission line 12 by a 95/5 fiberoptic splitter 16. The 5% side stream is further unevenly split by splitter 18 into two lines 22 and 24, e.g. 20% and 80%, respectively. The 80% line 24 goes through the wavelength locker 26 before entering the Detector 2. The output power of wavelength locker 26 will be changed if the central wavelength as well as total emitting power of the laser diode is changed. The 20% power directed to the Detector 1 directly is used as a reference of output power of the laser diode. Using the output of Detector 1 to normalize the output of Detector 2, changes in the normalized output of Detector 2 are caused solely by the wavelength or frequency shift of the laser diode. The outputs of two detectors are connected to a CPU or computer, which processes the data and sends a command to adjust the temperature of the laser diode by the built-in thermal-electric (TE) cooler. Therefore, a closed feedback loop is formed for tuning the wavelength to match the ITU grid. In this manner, frequency shift of the laser can be corrected by such tuning.

FIG. 2A is a cross-sectional view of a Fabry-Perot interferometer to illustrate the basic working principle of Fabry-Perot interferometry, which form the basis of Fabry-Perot interference filter. A Fabry-Perot interferometer relies on the interference of multiple reflected beams. As shown in FIG. 2A, incident light 100 experiences multiple reflections at each coated reflective surface, 101 and 102, respectively. Whenever there is no phase difference between the successive waves, constructive interference is produced and thus a transmission maximum occurs. In contrast, when there is a phase difference of 180° with successive waves, the transmission is minimum. In terms of mathematical interpretation, the transmission maximum occurs when round trip optical path length through the spacer 103 is an integer number of whole wavelengths. Namely, $$2d \times n \times \cos\theta = m\lambda \quad (1)$$

where d is the thickness of the spacer, n is the index of refraction of the spacer, and θ is the internal angle of reflection as shown in FIG. 2A, that is, the angle between beam 100 and a normal direction to surface 102 or 101. The transmission peak can be made very sharp by increasing mirror reflectivity. A typical transmission curve is shown in FIG. 2B. The spectral transmission full width half maximum is denoted as FWHM, and the interference fringe spacing in either frequency or wavelength is called free spectral range (FSR). Thus, the interference is controlled by the optical path length of the etalon, where the optical path length is determined by the spacing between the two reflective surfaces 101, 102, angle θ and the index of refraction n of the optical medium between the surfaces 101, 102. Where θ is zero, the product of the spacing and index of refraction is called optical length. These parameters determine frequency spacing (FSR as shown in FIG. 2B) between transmission peaks and the exact location of the peaks.

The above-described method for tuning lasers will result in accurate tuning if the optical path length of the etalon in the Fabry-Perot filter remains substantially unchanged despite temperature change and other environment influence. Thus, optical components used in wavelength division multiplexing and demultiplexing may be used in an environment where the temperature may range from −20° to 85° C. As material that is used in the etalon expands or contracts, this may cause the optical path length to change, thereby affecting stability of frequency peak location and frequency spacing of the etalon. Thus, in applications such as wavelength monitoring in fiberoptic wavelength division multiplexing transmission, the optical design of etalon and material selection for the spacer are critical.

The present invention is also directed to various techniques to overcome instability in thickness d, n and θ in equation (1) above due to environmental influences. With proper engineering design and material selection, the precision of Fabry-Perot filter can be made high enough to satisfy fiber optic telecommunication or cable TV transmission stability requirements.

The most significant factor affecting the accuracy of Fabry-Perot filter is the temperature effect on the pass band of the filter. For telecommunication, field application temperature range encountered is typically from −20° C. to 85° C. Fabry-Perot filters constructed from normal transparent materials would have temperature coefficient of $10^{-5}$ per ° C. This would translate into about accuracy of $10^{-3}$, i.e. a shift in peak location of 0.1% of the wavelength, which would be inadequate for laser frequency monitor and control applications.

In the present invention, it is contemplated that by using specially selected materials, construction and alignment procedure, different types of etalons can be constructed to satisfy various applications. Also the integration of etalons to optic fibers is presented.

FIG. 3 illustrates a basic Fabry-Perot etalon. Both end surfaces, 31 and 32 of the spacer 30 are coated with reflective coating. For application in 1550 nm as well as 1300 nm region, the coating is optimized for high reflectivity in these regions. For 100 GHz free spectral range, and for material made of Fused Silica, the thickness is about 1.027 mm. To optimize this filter in terms of thermal stability, an optical glass transparent in 1550 nm and 1300 nm, with low thermal coefficient of expansion (TEC) and negative dn/dt (ratio of index change to temperature change) is preferably used. The thermal coefficient of optical thickness is therefore defined as the collective effects of thermal expansion of physical size and refraction index change against temperature change. FK51 glass from Schott Glass Inc. (Duryea, Pa. 18642, USA) is an example of negative dn/dt (about $7.0 \times 10^{-6}$/° K) with average thermal coefficient of expansion of $15 \times 10^{-6}$. The thermal coefficient of optical thickness of FK51 is only $-1.0 \times 10^{-6}$/° K.

An ideal transparent material between the reflective surfaces has a low thermal expansion coefficient and negative dn/dt, so that the net optical length change as a function of temperature is minimized. Ultra low expansion (ULE) glass like Zerodur™ manufactured by Schott Glass Inc. and ULE™ glass by Corning Glass Inc. (Corning, N.Y. 14831) are good candidates, because they have almost zero TEC and small dn/dt. By using ULE™ glass, the accuracy is to be $10^{-4}$ over 100° temperature excursion or range.

FIG. 4. is a schematic view of a composite etalon, where two different optical materials, a spacer portion 41 of material A with positive temperature coefficient of optical length and a spacer portion 42 of material B with negative temperature coefficient such as Acrylic and Polycarb (cited from a paper published by Thomas Jamieson, *Optical Engineering*, Vol. 20(2), 1981, pp. 156–160, are stacked together and placed between the two reflective surfaces 31, 32 to provide minimum temperature sensitivity. The method to do so is as follows:

Assuming the free spectral range of the etalon is 100 GHz. The thickness for a typical fused Silica is 1.00 mm. Since fused Silica has positive temperature coefficient, this means that if the free spectral range is 100 GHz at −10° C., then at 85° C. the Free spectral range becomes 99.95. The composite scheme is to use a negative temperature coefficient material such as Schott glass FK51 to compensate for the positive coefficient of fused Silica. Suppose FK51 glass of thickness 1.00 mm change FSR from 100 GHz to 100.05 GHz over the temperature range from −20 to 85° C., then the composite etalon should be of the following construction: Fuse Silica 0.5 mm and FK51 0.5 mm. In general, the thermal compensation can be accomplished with any pair of positive/negative temperature coefficient optical glass. It is assumed that thermal coefficient HA of material A (41) in FIG. 4 is a positive value, and thermal coefficient HB of Material B is negative. Then, the optical thickness ratio for Material A is given by $$|HB|/(HA+|HB|) \quad (2)$$

Thickness for Glass A=|HB|/(HA+|HB|)*Ta where Ta is the desired ideal optical thickness for etalon. Similarly, for material B, optical thickness ratio for Material B is given by $$HA/(HA+|HB|) \quad (3)$$

Therefore, composite material thickness for Material B is given by

Thickness for B=HA/(HA+|HB|)*Tb

With this simple composite etalon construction, the thermal instability can be reduced by a factor of 10. An iterative procedure can reduce the thermal effect further. However, if the thermal effect is not a constant over the temperature range of −20 to 85° C., or if there is a wavelength dependent effect then we must take these factors into account. Nonetheless, a factor of 10 improvement is easily achievable. Material A and Material B can be kept in optical contact or bonded together by adhesive. By the above composite configuration, the error in free spectral range as well as center wavelength is as low as $10^{-5}$ over 100° C. temperature excursion.

FIG. 5 shows another embodiment of high accuracy etalon accomplished by a stable air gap. 51 and 52 are transparent material with reflectivity coatings on inner side of cavity as indicated by 53 and 54, respectively. The stability of air gap path is achieved by using temperature stable material such as Corning's ULE™ or Schott's Zerodur™ as spacer material in spacers 55 and 56, one on each side of the optical path between reflective surfaces 53, 54 on two supports 51, 52. Both materials have less than $10^{-7}$ thermal coefficient of expansion and thus we can achieve $10^{-5}$ thermal stability. The spacing for 100 GHz Free spectral range corresponds to 1.5 mm thickness for the spacer. The spacer need not be at the periphery of the device. Any "spacer' configuration which can maintain air optical length constant will do. In FIG. 6, a ULE™ glass 61 is placed sideways between two pieces of flat glass, 63 and 64. The light beam is passed through the air gap and bounced back and forth between the reflective coatings, 65 and 66.

The accuracy of the design in FIGS. 5 and 6 is limited by the small residual thermal expansion and optical path length change of air inside the gap. The index of refraction of air at standard temperature and pressure (STP) condition at 1550 nm is 1.000225. The change of refraction index of air is affected by temperature, pressure and humidity. The accuracy of this type of air gap etalon is between $10^{-5}$ and $10^{-6}$. The spacer in FIGS. 5 and 6 may have a thickness (i.e. direction along an optical path for the etalon) within a range of 0.85 to 1.05 mm, or an integral or fractional multiple thereof. The air gap may be within a range of 1.4 to 1.6 mm, or an integral or fractional multiple thereof.

As a direct consequence of error introduced by air and error correction/compensation from other material or construction, the vacuum gapped etalon as shown in FIG. 7 is painstakingly constructed to attain the ultimate stability.

Since air introduces about one part per million of error and Zerodur™ introduces about $1^{-3}$ part per million of error over temperature range of −20 to 85° C., if we want to have higher accuracy than this, vacuum gap is preferably used between the reflective coatings or pedestals 73A, 74A.

When a vacuum is in the gap between the surfaces, no optical path length change takes place that is caused by changes in the medium between the reflective coatings. If ULE™ glass is used to construct spacers 71A, 71B, since such material has 0 thermal coefficient of expansion, this device should have parts per billion stability.

However, if due to batch to batch variation, the gap width is still temperature sensitive, a compensation scheme, illustrated in FIG. 7 can be utilized. If the spacers 71A, 71B have residual thermal expansion coefficient of $10^{-8}$ and spacing of 1.5 mm, we can compensate this expansion by putting a pedestal, 73A and 74A of 15 um (30 um total) in thickness on each of the fused Silica end caps, 73 and 74, respectively, assuming Fused Silica has TEC of $5 \times 10^{-7}$. (The ratio of TEC is 50. The total thickness of the pedestals required for compensating the temperature effects of temperature change on spacers 71A, 71B is 1.500 mm/50=30 um. Thus the thickness of each pedestal on the end caps or pieces is 15 um. In this way, as the spacers expand, the pedestal also expands to cancel out the spacer expansion and thus results in no change in the distance or gap between the pedestals 73A, 74A. Tube 77 connect the chamber or cavity 70 between the reflective surfaces to a vacuum pump (not shown). After the vacuum is achieved in the cavity 70, the vacuum passage can be blocked at a location indicated by an arrow 78 to keep the vacuum condition. The vacuum gap between the two reflective surfaces may be within a range of 1.49 to 1.51 mm, or an integral or fractional multiple thereof.

Depending on the thickness of the optical interference coatings (pedestal) 73A, 74A, the thermal expansion of the coatings may have to be taken into account. However, this is second order effect, because the coating is only 1 to 2 um thick. In any case, if need be, this effect can be compensated for. The expected error after the above-described compensation is applied is of the order of $10^{-6}$ or less over a temperature range of −20 to 85° C.

To achieve low loss in Fabry-Perot etalon as well as render it useful and practical, the incident light to the etalon is preferably well collimated. FIG. 8 illustrates a collimating means including a Gradient Index (GRIN) lens and a ferrule. The fiber 81 is secure inside the center hole 83 of the ferrule 82. The light exiting ferrule at face 81A is collimated to become a parallel beam through a GRIN lens 84 with a proper length. Collimating means other than a GRIN lens may also be used.

FIG. 9A shows an embodiment integrating etalon to fibers via a pair of GRIN lenses. Fabry-Perot etalon 90 can be any type of the above mentioned etalons, including one where its optical path length is accurate to within 0.5 or even 0.2 microns. GRIN lenses 91 and 92 are adjacent to and preferably abut the opposite end surfaces of etalon 90, respectively. End surfaces 91A and 92B of Lens 91 and 92, respectively, can be either directly bonded to the end surfaces 90A and 90B of etalon 90 by adhesive or be kept separate therefrom by an air gap. If an air gap is elected, it is appropriate to apply anti-reflective coatings to the end surfaces 91A, 90A, 90B and 92B to reduce the unwanted reflection on these surfaces. Input fiber 97 and output fiber 98 are respectively secured inside the ferrule 97A and 98A. The light from fiber 97 becomes a parallel upon exiting GRIN lens 91. The parallel beam enters the etalon 90 and bounce back and forth within the etalon to do multiple interference. The transmitted light 99 is focused to output fiber 98 by the GRIN lens 92. In reference to FIG. 9B, where radiation having a broadband flat spectrum indicated by 910 is transmitted through the embodiment of FIG. 9A, a multiple peaks spectral is produced at the output in fiber 98, as shown in FIG. 9C as 920.

FABRICATION PROCESS (A) Thickness Control:

As indicated above, it is desirable to maintain dimension stability of the etalon against temperature change and other environmental changes. This section describes how an etalon can be fabricated with dimension accuracy within 0.5 or even within 0.2 micron. If a universal wavelength locker applicable to all 100 GHz spacing ITU channels with peak inaccuracy within 5 GHz is desired, the dimensional accuracy of the optical thickness of etalon at room temperature will need to be within 0.2 micron. This dimensional accuracy is not easy to be achieved by grounding and polishing of glass. Vapor thin film deposition may be used instead, such as electron assisted deposition or chemical vapor deposition to increase the thickness of the spacer of etalon if the spacer is a little thinner, say by a few microns, than the ideal value. On the contrary, etching process such as wet etching and chemical vapor etching can be used to decrease the thickness if the spacer resulted from the polishing is originally thicker than the ideal dimension. The ideal vacuum gap corresponds to 100 GHz is 1.49896276 mm. By equation (1), every 0.2 micrometer deviation from the ideal vacuum gap will cause an 0.1 nm shift in location peaks of the etalon spectral line.

(B) Angle Tuning:

FIG. 11 illustrates how a Gradient index (GRIN) lens may be used in conjunction with an etalon mentioned above to form a tunable wavelength locker. The GRIN lens 111 has a geometrical and optical center axis 112. The lens 111 has two surfaces 113 and 114 perpendicular to the center axis 112. An incident ray 116 parallel to but at an offset distance r to the center axis 112 of the lens 111 strikes the surface 113. Due to a quasiparabolic refraction index distribution with the maximum index at the center of the GRIN lens 111, the ray 116 is bent toward the center and hits the surface 114 at point p with an angle $\theta_L$. It is important to know that the impinging angle $\theta_L$ varies linearly with the displacement r from the center axis 112. If a quarter pitch GRIN lens is used, $\theta_L = A^{1/2} \times r$, where $A^{1/2}$ is an index gradient constant that can be obtained from the SELFOC, a product Guide of NSG America, Inc., located in Somerset, N.J.

FIG. 12 illustrates a wavelength locker with the capability of adjusting the effective optical length of etalon and thus its peak location of spectral line. The input fiber 121 is displaced a distance r from the center axis or line 128 of the GRIN lens 123. The beam exiting the fiber 121 is collimated by the GRIN lens 123 and then exits the surface 123A with an angle to the normal of the surface. The beam then enters the etalon 125 with an angle $\theta$. The internal angle $\theta$ reduces the effective optical length of etalon as indicated in Equation 1 by a factor of cos $\theta$. By choosing an appropriate non-zero $\theta$, the apparent center wavelength of the peak transmission may be decreased to a value substantially equal to a desired optical path length which corresponds to desired frequency peak and spacing values. The transmitted power is focused back to the output fiber 122 through the other GRIN lens 124.

FIG. 10A shows a four wavelengths WDM system with wavelength monitoring capability. Four individual wavelength lockers are used for monitoring wavelength drift of each of four wavelength channels. The system in FIG. 10A is equivalent to one including four of the systems in FIG. 1B where signals from the main channels of the four systems are multiplexed. Four wavelength lockers can have either the same or different optical characteristics. There is component redundancy in the monitoring function of FIG. 10A. In FIG. 10B, a more economical solution is proposed by using a fiberoptic multichannel switch. The multichannel switch 151 is used to select one channel for checking at a time by tapping light from one of the transmission lines at a time. The common fiber 152 of the multichannel switch 151 is connected to a monitoring functional block which is the same as system 10 in FIG. 1B. The typical switching time of a multichannel switch such as one proposed in U.S. Pat. No. 4,896,935 is about 100 millisecond which is two orders shorter than the typical time scale of laser wavelength drift. Longer scanning time periods for switching of switch 151 are possible, such as those up to 10 (i.e. at 0.1 Hz frequency) or 100 seconds. A CPU or computer 28 is used to control the surveillance of multichannel switch 151 for each wavelength channel so that the channels are monitored sequentially by sequentially connecting the tapped signal from a channel to the locker. The CPU also process power reading from the two detectors, 1 and 2.

Another advantage of F-P etalon is that the extremely narrow wavelength spacing between two peaks is practical by increasing the optical length of etalon. For example, by doubling the vacuum gap of 100 GHz ITU grid, an F-P spectral line of 50 GHz peak spacing is obtained. A 50 GHz spacing in frequency is equivalent to 0.4 nm spacing in wavelength, which is extremely difficult to be produced by thin-film coating filter or fiber grating filter. Therefore, for extremely narrow band transmission in wavelength division multiplexing system, a wavelength locker using a stable etalon as mentioned above can be used as a filter. FIG. 13A shows a F-P etalon type of wavelength locker 131 that can be used to produce a spectral line with multiple transmission peaks at wavelengths of $\lambda_{n-1}, \lambda_n, \lambda_{n+1}$ etc. Light or radiation carried on a fiber and with a broadband spectrum as shown in FIG. 13B enters the F-P wavelength locker 131, and leaves it with a multiple transmission peaks of spectral line indicated by 133 in FIG. 13C. In FIG. 14A, a relatively wide band filter 135 is added before the F-P wavelength locker 136. The filter 135 can be made by thin-film coating as disclosed in U.S. Pat. No. 5,453,827 invented by Ho-Shang Lee. The filter 135 is used to eliminate all transmission peaks except the one at $\lambda_n$. Then, the wavelength locker 136 is used to further reduce the pass bandwidth. By this hybrid design, a pass bandwidth less then 0.2 nm can be easily produced.

While the invention has been described by reference to various embodiments, it will be understood that modification changes may be made without departing from the scope of the invention which is to be defined only by the appended claims and their equivalents.

What is claimed is:

1. A method for locking the frequencies of a plurality of radiation sources substantially to predetermined equally spaced frequencies spaced apart by a predetermined frequency spacing, comprising:

providing one or more frequency lockers having equally spaced periodic frequencies with a free spectral range (FSR) substantially equal to the predetermined frequency spacing, wherein said periodic frequencies are close to the predetermined frequencies;

passing radiation from each of the sources through the locker or one of the lockers;

detecting radiation passed by the locker or one of the lockers and providing first outputs; and adjusting the frequency of each of the sources in response to one of said first outputs.

2. The method of claim 1, further comprising detecting radiation from the sources to provide second outputs, wherein the adjusting adjusts the frequency of each of the sources in response to the first and second outputs.

3. The method of claim 1, wherein the passing passes radiation of the sources sequentially, the detecting detects radiation from the sources sequentially and the adjusting adjusts the frequencies of the sources sequentially.

4. The method of claim 3, wherein the passing, detecting and adjusting are performed on the sources at a frequency of at least about 0.1 Hz.

5. An apparatus for locking the frequencies of a plurality of radiation sources substantially to predetermined equally spaced frequencies spaced apart by a predetermined frequency spacing, comprising:

one or more frequency lockers, the locker or each of the lockers having equally spaced periodic frequencies with a free spectral range (FSR) substantially equal to the predetermined frequency spacing, means for passing radiation from each of the sources through the locker or one of the lockers;

one or more first detectors detecting radiation passed by the locker or one of the lockers to provide first outputs; and means for adjusting the frequency of each of the sources in response to said first outputs.

6. The apparatus of claim 5, wherein said periodic frequencies are close to the predetermined frequencies.

7. The apparatus of claim 5, further comprising one or more second detectors detecting radiation from the sources to provide second outputs, wherein the adjusting means adjusts the frequency of each of the sources in response to the first and second outputs.

8. The apparatus of claim 5, said apparatus comprising only one frequency locker and further comprising a multi-channel switch supplying radiation from each of the sources sequentially to the locker so that the adjusting means adjusts the frequencies of the sources sequentially.

9. The apparatus of claim 8, wherein the multi-channel switch is operated at a scanning period of about 100 seconds or less.

10. The apparatus of claim 5, wherein the locker includes an etalon having an optical path length that is accurate to about 0.5 microns or better.

11. A frequency sorting device, comprising:

an etalon having an optical path length that is accurate to about 0.5 microns or better;

an input optical fiber supplying radiation to the etalon; and an output optical fiber delivering radiation from the etalon.

12. The device of claim 11, said etalon comprising two reflective surfaces and a spacer between the two surfaces, said spacer including two portions having different optical and/or thermal expansion characteristics.

13. The device of claim 12, one of the two portions having a positive thermal coefficient of optical thickness and the other of the two portions having a negative thermal coefficient of optical thickness.

14. The device of claim 12, one of the two portions having a positive refraction index to temperature change ratio and the other of the two portions having a negative refraction index to temperature change ratio.

15. The device of claim 12, wherein said two portions include fused silica and/or Schott FK51 glass.

16. The device of claim 12, said etalon having an optical path through the two portions, wherein each of the two portions has an optical thickness proportional to a thermal expansion coefficient of the other portion.

17. The device of claim 11, comprising two reflective surfaces and a spacer between the two surfaces, said spacer having a thickness of about 0.85 mm to 1.05 mm or an integral or fractional multiple of such range.

18. The device of claim 11, comprising two reflective surfaces and an air gap between the two surfaces, said air gap being about 1.4 mm to 1.6 mm or an integral or fractional multiple of such range.

19. The device of claim 11, comprising two reflective surfaces and substantially a vacuum between the two surfaces, said surfaces being separated by a distance within about 1.49 to 1.51 mm or an integral or fractional multiple of such range.

20. The device of claim 11, comprising two reflective surfaces and a spacer between the two surfaces, said spacer including Zerodur™ or ULE™ glass.

21. The device of claim 11, said etalon having an optical path, comprising:

two reflective surfaces;

two pedestals, each pedestal supporting one of the two surfaces; and one or more spacers between the two pedestals, wherein the dimensions of the spacer(s) and the pedestals along the optical path and their thermal expansion coefficients are such that temperature effects on the pedestals substantially cancel those on the spacer(s) within a temperature range.

22. The device of claim 21, said temperature range is from about −20 to 85 degrees Centigrade.

23. The device of claim 11, said optical path length being accurate to about 0.5 microns or better within a temperature range from about −20 to 85 degrees Centigrade.

24. The device of claim 11, said input fiber supplying broad band radiation to the etalon, said output fiber delivering radiation having periodic frequencies with a frequency spacing from the etalon.

25. The device of claim 11, said input fiber supplying radiation within a pass band to the etalon, said output fiber delivering radiation having a narrower band width than the pass band from the etalon.

26. The device of claim 25, further comprising a filter filtering and passing radiation within said pass band to the input fiber.

27. A frequency sorting method, comprising:

providing an etalon having an optical path length that is accurate to about 0.5 microns or better;

supplying broad band radiation to the etalon; and delivering from the etalon radiation having periodic peak frequencies with a frequency spacing.

28. A frequency sorting method, comprising:

providing an etalon having an optical path length that is accurate to about 0.5 microns or better;

supplying radiation within a pass band to the etalon; and delivering radiation having a narrower band width than the pass band from the etalon.

29. The device of claim 28, said supplying including filtering and passing radiation through a filter having said pass band.

30. An optical device comprising:

an etalon having two reflective surfaces, said etalon having an optical path between the two surfaces having a length that is accurate to about 0.5 microns or better; and a first GRIN lens abutting one of the surfaces.

31. The device of claim 30, further comprising a second GRIN lens abutting the other one of the surfaces.

32. The device of claim 31, said lenses being separated from the etalon by a gap, said device further comprising anti-reflection coatings on the etalon and the two lenses.

33. The device of claim 30, said first GRIN lens having an axis, said device further comprising means for supplying along a first input optical path substantially parallel to said axis, incident on the first GRIN lens and at a distance from the axis.

34. The device of claim 33, said supplying means being an input optical fiber.

35. The device of claim 34, further comprising an output optical fiber delivering a beam of radiation from the etalon.

36. The device of claim 32, further comprising an adhesive attaching the lenses to the etalon.

37. A method for making an etalon, comprising:

determining a desired optical path length for the etalon;

providing two reflective surfaces; and adjusting the optical path length of the etalon, said adjusting including changing a distance between the surfaces or altering an angle of incidence of a beam of radiation on said surfaces so that an optical distance through an optical medium between the surfaces is substantially equal to the desired optical path length, said changing including thin film deposition or etching.

38. The method of claim 37, said altering including:

passing said beam through a first GRIN lens having an axis along a first input optical path substantially parallel to said axis incident on the first GRIN lens and at a distance from the axis; and selecting said distance so that, after passing the lens, said beam impinges the etalon at such an angle that the optical path length of the etalon is substantially equal to the desired optical path length.

39. The method of claim 38, said altering further comprising passing a beam of radiation from the etalon through a second GRIN lens.

40. A multiplexer system comprising:

a plurality of radiation sources providing radiation at predetermined equally spaced frequencies spaced apart by a predetermined frequency spacing;

a plurality of optical channels, each channel conveying radiation from a corresponding source to a wavelength division multiplexer or from a wavelength division demultiplexer;

a frequency locker having equally spaced periodic frequencies with a free spectral range (FSR) substantially equal to the predetermined frequency spacing for detecting a frequency shift of radiation from each of the sources and to provide an output;

splitters, each splitter diverting a percentage of radiation from a corresponding optical channel;

a multi-channel switch sequentially providing radiation diverted by one of the splitters to the frequency locker to sequentially detect a frequency shift in the plurality of sources; and means for adjusting frequencies of the plurality of sources in response to the output.

41. A method for locking the frequencies of a plurality of radiation sources to International Telecommunication Union (ITU) frequencies, comprising:

measuring a frequency shift of said sources relative to said ITU frequencies; and adjusting the frequencies of said radiation sources in response to said frequency shift so that such frequencies are substantially equal to said ITU frequencies.

42. The method of claim 40, wherein the frequencies of said radiation sources are adjusted to be within about 5 GHz of said ITU frequencies.

* * * * *